United States Patent Office 3,830,878
Patented Aug. 20, 1974

3,830,878
WEATHER- AND IMPACT-RESISTANT RESIN COMPOSITION COMPRISING A GRAFT COPOLYMER CONTAINING MULTI - LAYER POLYMER PARTICLES AND A RIGID RESIN
Tetsuji Kato, Mikio Izumi, Kunio Chikanishi, Ryoji Handa, and Jinpee Kobayashi, Ohtake, Japan, assignors to Mitsubishi Rayon Co., Ltd., Tokyo, Japan
No Drawing. Filed Dec. 17, 1971, Ser. No. 209,422
Claims priority, application Japan, Dec. 18, 1970, 45/113,069
Int. Cl. C08f 41/12
U.S. Cl. 260—876 R     9 Claims

ABSTRACT OF THE DISCLOSURE

A weather- and impact-resistant resin composition obtained by polymerizing 5 to 1900 parts by weight of a monomer mixture (b) of 90 to 10 parts by weight of an aromatic vinyl compound and 10 to 90 parts by weight of at least one acrylic unsaturated compound (100 parts by weight in total) in the presence of 100 parts by weight (solids) of a latex of a crosslinked elastomer (a) consisting of 60 to 99.9 parts by weight of at least one acrylic ester, 39.9 to 0 part by weight of at least one monomer copolymerizable therewith, and 0.1 to 10 parts by weight of a crosslinking monomer having 2 or more functional groups, which is copolymerizable with both said monomers, and/or an organic peroxide (100 parts by weight in total); and, if desired, mixing a rigid resin (d) with the resulting copolymer (c) so that the composition contains 5 to 40% by weight of (a), the composition being characterized in that the particles of said crosslinked elastomer latex are produced in 2 or more separate steps so that the first layer, i.e. the most inner layer of the particles contains 90 to 40 parts by weight of the 100 parts by weight of (a) and has a degree of swelling of 7 to 30 and the second or subsequent layers, i.e. outer layers contain 10 to 60 parts by weight of the 100 parts by weight of (a) and have a degree of swelling of 7 to 3, whereby the particles have at least two layers different in composition and/or degree of swelling, and the outer layer or layers of the particles are higher in elasticity than the inner layer.

---

This invention relates to a weather- and impact-resistant resin composition. More particularly, this invention relates to the said resin composition characterized in that the particles of the acrylic ester-type cross-linked elastomer latex contained therein have at least two layers different in composition and/or degree of swelling.

The ABS resin, which is an impact-resistant, binary resin consisting of rubber and resin, has made a remarkable growth in recent years as an engineering plastic. However, owning to the diene compound contained, the ABS resin is inferior in weather-resistance, and its outdoor uses are restricted. Although said defect can be remedied to a certain degree by the addition of an ultraviolet absorber or an antioxidant, no fundamental improvement in weather resistance of such a resin has been successful with such additives. To achieve the fundamental improvment in weather-resistance, other rubbers than the diene-type were investigated and an alkyl acrylate-type rubber was proposed as a suitable component. However, the resin composition with such a modification is insufficient in inprovement of the weather resistance and still has some problems in impact resistance, appearance of the molded articles, and so on, so that it is not satisfactory for practical use.

The resin composition of the two-component rubber-resin type represented by the ABS resin can also be prepared by mechanical mixing of the rubber component and the resin component, but in view of impact strength, other mechanical properties, appearance, and moldability, it is usually produced by polymerizing an unsaturated monomer that forms resin component in a latex-like aqueous dispersion of a rubber component (this polymerization is called "polymerization in the presence of a rubber latex" or "graft polymerization"), and the resulting resin is used as such or in admixture with a rigid resin prepared separately.

The acrylic ester-type elastomers for use as a rubber component are generally required to contain a rubber component having a crosslinked, reticular structure. To obtain an acrylic elastomer of the said structure particularly in the form of a latex, there has been used a method in which the emulsion polymerization is effected in the presence of a polyfunctional monomer or a method in which the crosslinking is effected with an organic peroxide such as benzoyl peroxide. The acrylic ester-type rubber has defects of low hardness and slow elastic recovery as compared with the diene-type rubber. When a resin composition is prepared using such a rubber component and used as a molding material in injection molding, the orientation of the rubber component becomes so marked that the entire surface of the molded article shows a pearl lustre which is even enhanced upon coloring so that the article is unsuitable for general use. The impact strength of such a molding material shows marked local fluctuation. One means to remedy the above-mentioned disadvantages is to increase the crosslinking degree of the rubber. However, if the rubber is highly crosslinked, the impact strength is markedly lowered through the appearance is improved. Then, it may be imagined that a highly crosslinked rubber, which is effective for improvement in appearance, is blended with a rubber which is crosslinked to such an extent that a sufficient impact strength can be imparted. Such a blend, however, was found to be ineffective. It is also known that in a resin composition containing a rubber, generally, the particle size distribution of the rubber strongly affects the physical properties of the resin composition. On the other hand, it is considered that each particle of the rubber is homogeneous, and hence, the crosslinking degree is necessarily uniform in each particle.

The present inventors have paid their attention to the above-mentioned homogeneity of the crosslinking degree of the rubber particles, and tried to make ununiform the crosslinking degree in each particle of the acrylic ester-type elastomer. It has unexpectedly been found as a result that the weather resistance and the impact resistance (particularly, notched impact strength) are markedly improved in the case of a rubber-resin composition prepared by using rubber particles having ununiform cross-linking degree. Based on this finding, the present invention has been accomplished.

According to this invention, there is provided a weather- and impact-resistant resin composition obtained by polymerizing 5 to 1900 parts by weight, preferably 20–500 parts by weight, of a monomer mixture (b) of 90 to 10 parts by weight of an aromatic vinyl compound and 10 to 90 parts by weight of at least one acrylic unsaturated compound (100 parts by weight in total) in the presence of 100 parts by weight (solids) of a latex of a crosslinked elastomer (a) consisting of 60 to 99.9 parts by weight, preferably 99.7 to 85 parts by weight, of at least one acrylic ester, 39.9 to 0 part by weight, preferably 14.7 to 0 parts by weight, of at least one monomer copolymerizable therewith, and 0.1 to 10 parts by weight, preferably 0.3 to 5 parts by weight, of a crosslinking monomer having 2 or more functional groups, which is copolymerizable with both said monomers, and/or an organic peroxide (100 parts by weight in total); and, if necessary, blending a rigid resin (d) with the resulting copolymer (c) so that the composition contains 5 to 40% by weight of (a), the composition being characterized in that the particles of said crosslinked elastomer latex have at least two layers different in composition and/or degree of swelling, and the outer layers thereof have higher elasticities than the inner layer, the central layer of the particles containing 90 to 40 parts by weight, preferably 90 to 60 parts by weight, of the 100 parts by weight of (a) and having a degree of swelling of 7 to 30, preferably 8 to 15 and the outer layer or layers containing 10 to 60 parts by weight, preferably 10 to 40 parts by weight, of the 100 parts by weight of (a) and having a degree of swelling of 7 to 3, preferably 6 to 3.

The acrylic esters which can be used in this invention include alkyl esters, the alkyl thereof having 1 to 8 carbon atoms such as, for example, methyl, ethyl, butyl, octyl and 2-ethylhexyl; haloalkyl esters, the haloalkyl thereof preferably having 1 to 8 carbon atoms such as chloroethyl acrylate; and aromatic esters such as benzyl acrylate and phenethyl acrylate. They are used alone or in combination, and at least one of the acrylic esters is preferably the alkyl ester mentioned above. These esters should be contained in an amount of at least 60 parts by weight in 100 parts by weight of the elastomer in order that the elastomer may remain in the rubber state below room temperature. In order that the elastomer may have a crosslinked structure, the acrylic esters are polymerized in the presence of a polyfunctional monomer, such as unsaturated acid esters of polyols (the ester preferably having 8 to 20 carbon atoms), for example, ethylene glycol dimethacrylate and the like, unsaturated alcohol esters of polybasic acids (the ester preferably having 8 to 30 carbon atoms), for example, triallyl cyanurate, triallyl isocyanurate, and the like, divinyl compounds in a narrow sense, for example, divinylbenzene and the like, unsaturated alcohol esters of unsaturated acids (the ester preferably having 6 to 12 carbon atoms), for example, allyl methacrylate and the like, phosphoric acid esters, for example, triallyl phosphate and the like, and 1,3,5-triacryloylhexahydro - s - triazine. Particularly preferable polyfunctional monomers are triallyl cyanurate, triallyl isocyanurate, triallyl phosphate, allyl methacrylate, ethylene glycol dimethacrylate, and 1,3,5-triacryloylhexahydro-s-triazine. Alternatively, the polymerized acrylic esters in the form of a latex are crosslinked with an organic peroxide such as benzoyl peroxide, dicumyl peroxide, and the like. A combination of the above-said two methods of crosslinking is also applicable. The proportion of the said polyfunctional monomer and/or organic peroxide used in the crosslinking is 0.1 to 10 parts by weight per 100 parts by weight of the elastomer. The elastomer may contain, in addition to the above-said indispensable components, one or more copolymerizable monomers of the vinyl or vinylidene type, such as, for example, methyl methacrylate, n-butyl methacrylate, acrylonitrile, methacrylonitrile, styrene, α-methyl styrene, acrylamide, or the like, in a proportion of not more than 39.9 parts by weight per 100 parts by weight of the elastomer.

In practicing the invention, in order that particles of the crosslinked elastomer latex have at least two layers different in composition and/or degree of swelling, and the outer layers thereof have higher elasticities than the inner layer, said latex may be prepared in the following way.

At first, conventional emulsion polymerization is conducted using a composition of components which gives an elastomer having a relatively low crosslinking degree (corresponding to a degree of swelling of 30 to 7). In this case, the polymerization can be effected by introducing into the polymerization system the whole amount of the monomer mixture at one time, or adding to the polymerization system the monomer mixture portionwise or continuously. The crosslinked structure is formed by adding a polyfunctional monomer to the monomer mixture, or by crosslinking the polymer with an organic peroxide after polymerization, or by a combination of these two methods. A second mixture of monomers is then polymerized while continuously dropping the mixture into the polymerization system in the presence of the thus obtained crosslinked elastomer under such conditions as can suppress the formation of new particles as completely as possible and that a dispersion stabilizer such as emulsifier can be maintained in an amount necessary for coating the surface of elastomer particles. If necessary, a third monomer mixture, a fourth monomer mixture, etc. can be polymerized similarly to the above. In order that the elastomers obtained in the second and later stages have a higher elasticity than in the first stage, there may be used a larger amount of the crosslinking agent than in the first stage or a crosslinking agent having higher crosslinking efficiency than in the first stage. Alternatively, a more rigid component, or a larger amount of the rigid component may be added in the second and later stage. By the above procedure, the layers formed in each elastomer particle which are formed in the second and later stages are allowed to have a degree of swelling of 7 to 3, which is lower than that in the layer formed in the first stage. The suitable proportion of the first stage polymer to the second and later stage polymers is 90 to 40 parts by weight of the former against 10 to 60 parts by weight of the latter. When the first stage polymer exceeds 90 parts by weight, the expected effect of the multilayer structure does not appear, while when it is less than 40 parts by weight, the resulting elastomer becomes unfavorable with respect to the impact resistance. The above-mentioned multilayer structure of rubber particles and the uniformity in crosslinking degree of rubber particles are the most important points of this invention.

If the swelling degree of the elastomer formed in the first stage is higher than 30, the molded articles show an unfavorable appearance, while the impact strength becomes too low if the degree of swelling is lower than 7. The degree of swelling of the elastomers formed in the second and later stages are selected from the range of 7 to 3 chiefly for the purpose of improving the appearance of the molded articles. Where an elastomer such as an acrylic rubber is used, the molded articles are markedly improved in appearance when the outer layer of the rubber particles has a higher hardness and a higher elasticity than those of the inner layer. The weather resistance is also improved when the inner layer of rubber particles has a higher elasticity and the outer layer has a lower elasticity, though this case is outside the present invention. Such a structure can be designed for the rubber particle if the molded articles are destined for applications not requiring a good appearance.

That the crosslinked elastomer particles obtained as mentioned above each have layers different in crosslinking degree or structure, is presumable from the facts that the degree of swelling of crosslinked elastomers which have separately been obtained from each stage monomer mixture alone are different from that of the crosslinked elastomer obtained by the aforementioned technique, and that the formation of new particles is deemed to be substantially suppressed because the diameter of crosslinked elastomer particle increased substantially arithmetically as the polymerization stage proceeds.

In the presence of 100 parts by weight (solids) of the crosslinked elastomer latex containing 60% by weight or more of the acrylic ester obtained by the abovementioned method, 5 to 1900 parts by weight of a monomer or a mixture of two or more monomers selected from aromatic vinyl compounds (preferably styrene or α-methylstyrene) or acrylic monomers (preferably acrylonitrile, methacrylonitrile, acrylic or methacrylic esters of alkanols having 1 to 4 carbon atoms) are polymerized with a radical initiator by introducing into said latex said monomer or mixture of monomers at one time, portionwise, or continuously. The continuous feeding procedure is preferred particularly in the case where a large amount of the monomer or monomers is polymerized in the presence of the rubber latex, in order to maintain the melt fluidity of the resulting polymer and to promote the formation of the graft polymer. The polymerization product obtained by polymerization in the presence of rubber latex can be used as such as far as the content of the crosslinked elastomer is within the range of 5 to 40% by weight based on the weight of the product. If necessary, however, including the case were the content exceeds the upper limit of said range, the polymerization product can be admixed with a rigid resin produced independently so that the resulting composition contains 5 to 40% by weight of the crosslinked elastomer. The rigid resin to be used in this case is preferably selected from styrene-methyl methacrylate - acrylonitrile terpolymers, styrene - acrylonitrile copolymers, styrene-acrylonitrile-acrylic ester terpolymers and polycarbonates.

The impact-resistant composition obtained by the process of this invention can be blended, if necessary, with coloring agents such as dyes and pigments, stabilizers against light or heat, plasticizers, foaming agents, inorganic or organic fillers in the form of granules, powders, or fibers. The composition can be molded by various molding method, such as injection molding or extrusion molding, and can be utilized in various shaped articles for which weather and impact resistance is required and in an element of multi-layer structures, such as the outer layer of the structure.

The invention is further explained in more detail hereinafter with reference to Examples, which are merely by way of illustration and not by way of limitation.

Subsequently, a monomer mixture comprising 27 parts of BuA, 1.8 parts of MMA, 1.2 parts of ethylene glycol dimethylacrylate (EDMA), and 0.6 part of TAC, and containing dissolved therein 0.72 part of Pelex OTP was dropped therein over 30 minutes in a manner similar to that mentioned above. After completion of the dropwise addition, the reaction was continued at the same temperature for a further 30 minutes to complete the polymerization. The resulting rubber had a DS of 6.0, a gel content of 98% and a particle diameter of 0.27μ. A rubber, which was obtained separately by polymerizing the said second monomer mixture alone, had a DS of 4.6.

In a manner similar to that mentioned above, rubber latices of compositions as shown in Table 1 were synthesized.

The determination of DS was carried out in the following way:

A rubber latex was allowed to stand at 60° C. to be dried into a film. 0.2 to 0.3 g. ($W_0$) of film was weighed into a weighing bottle and admixed with methyl ethyl ketone in an amount of about 150 times the weight of the film. After having been allowed to stand in a thermostat at 30±0.5° C. for 24 hours, the weight ($W_1$) of the sample was determined. The sample was then completely dried and again weighed ($W_2$).

$$DS = \frac{W_1 - W_2}{W_2}$$

$$\text{Gel content (percent)} = \frac{W_2}{W_0} \times 100$$

TABLE 1

| No. | 1st stage monomer composition ||||| | 2d stage monomer composition |||||||
|---|---|---|---|---|---|---|---|---|---|---|---|---|---|
|     | BuA | MMA | TAC | Others | DS | Part | BuA | MMA | EDMA | TAC | Others | DS | Part |
| A-2 | 100 | | | BPO 1.0 | 11.0 | 60 | 90 | 10 | | 1.0 | | 6.0 | 40 |
| A-3 | 40 | 10 | 0.5 | 2EHA, 50 | 10.2 | 70 | 90 | 10 | | 1.0 | | 6.0 | 30 |
| A-4 | 95 | | 0.3 | AN, 5 | 14.3 | 80 | 90 | 6 | 4 | | 3 | 4.2 | 20 |
| A-5 | 90 | 10 | | TAIC, 0.5 | 9.8 | 50 | 90 | | 4 | | 2 AN, 6 | 4.0 | 50 |
| A-6 | 95 | 5 | | TAP, 0.5 | 11.0 | 70 | 90 | 6 | 4 | | 2 | 4.6 | 30 |
| A-7 | 95 | 5 | 0.3 | | 14.0 | 50 | 95 | 5 | | 0.7 | | 6.3 | 30 |

| No. | 3d stage monomer composition ||||| | Properties of elastomer |||
|---|---|---|---|---|---|---|---|---|---|
|     | BuA | MMA | TAC | Others | DS | Part | Dia. of particle, μ | DS | Gel content, percent |
| A-2 | | | | | | | 0.29 | 6.8 | 94 |
| A-3 | | | | | | | 0.24 | 6.3 | 97 |
| A-4 | | | | | | | 0.17 | 5.6 | 96 |
| A-5 | | | | | | | 0.20 | 5.2 | 93 |
| A-6 | | | | | | | 0.17 | 6.0 | 94 |
| A-7 | 90 | 6 | 2 | EDMA, 4 | 4.6 | 20 | 0.18 | 6.2 | 96 |

NOTE.—BPO stands for benzoyl peroxide. In the case where BPO is used, the monomer mixture containing BPO dissolved therein was polymerized using redox initiator at a temperature of 30° C, and the polymerizate was then subjected to crosslinking reaction at 95° C. for 3 hours to obtain the crosslinked polymer.
2EHA stands for 2-ethylhexyl acrylate, AN for acrylonitrile, TAP for triallyl phosphate, and TAIC for triallyl isocyanurate.
The DS values shown in Table 1, in the columns of the first, the second, and the third stage monomer composition, are of the respective polymers obtained by independently polymerizing the respective monomer mixtures.
The diameter of particles was estimated from the electron-microscopic and light absorbence data.

In the Examples, all parts and percentages are by weight unless otherwise specified.

EXAMPLE 1

A. Synthesis of rubber

A-1: In a reactor was placed 200 parts of deionized water containing 0.15 part of potassium persulfate (KPS), which had been flushed with nitrogen. Into the vessel was dropped a nitrogen-flushed monomer mixture comprising 63 parts of n-butyl acrylate (BuA), 7 parts of methyl methacrylate (MMA), and 0.35 part of triallyl cyanurate (TAC), and containing dissolved therein 1.68 parts of Pelex OTP (sodium dioctyl sulfosuccinate, 70% pure, produced by Kao-Atlas Co.) under a nitrogen atmosphere over about 1.5 hrs. at 70° C. After completion of the dropwise addition, the reaction was continued at the same temperature for a further 30 minutes to complete the polymerization. The degree of swelling (DS) of the polymer sample taken at this stage was 9.7.

B. Preparation of graft polymer

B-1: About 300 parts (100 parts of solids) of the rubber latex A-1 and 600 parts of deionized water are placed in a reactor and flushed with nitrogen. Separately, 60 parts of MMA, 60 parts of AN and 180 parts of styrene (St) were mixed and flushed with nitrogen. 1.5 parts of BPO was dissolved in 30 parts by weight of the 300 parts of the resulting monomer mixture and the resulting mixture was added to the reactor. The contents of the reactor were stirred at room temperature under a nitrogen stream for 30 minutes. The temperature of the contents of the reactor was then elevated to 70° C. The remaining 270 parts of the above-said monomer mixture was added to the reactor at a rate of 60 parts per hour. After completion of the dropwise addition, the temperature of the contents of the reactor was elevated to 80° C., and the reaction was continued for about 30 minutes to complete the polymerization. A portion of the polymerization product was taken out, coagulated and dried. The resulting dry powder was extracted with methyl ethyl ketone (MEK) at 90° C. for 8 hours to be separated into the MEK-soluble portion and the MEK-insoluble portion. The MEK solution of the soluble polymer was concentrated and then the polymer was precipitated by means of methanol. After having been dried, the polymer was dissolved in dimethylformamide to obtain a solution and the viscosity thereof was measured at 25° C., from which [$\eta$] was found to be 0.81 dl./g.

B-2: In a manner similar to that in B-1, to 100 parts of the rubber A-2 was added a monomer mixture comprising 24 parts of St and 6 parts of AN, together with deionized water containing 0.15 part of potassium persulfate dissolved therein. The resulting mixture was subjected to reaction at 70° C. for 90 minutes.

B-3: A graft polymer was obtained in the same manner as in B-2, except that the rubber A-3 was substituted for the rubber A-2.

B-4: A graft polymer was obtained in the same manner as in B-1, except that the rubber A-4 was substituted for the rubber A-1. The [$\eta$] value of the extracted polymer was found to be 0.79 dl./g.

B-5: In a manner similar to that in B-1, using the rubber A-5, 150 parts of a monomer mixture of St/MMA/AN=60/20/20 was graft-polymerized to obtain a latex. The [$\eta$] value of the extracted polymer was found to be 0.83 dl./g.

B-6: In the same manner as in B-1, 200 parts of a monomer mixture comprising monomers in the proportion St/MMA/AN=60/20/20 was polymerized, except that the rubber latex A-6 was substituted for the rubber A-1. The polymer extracted from the polymerization product had a [$\eta$] value of 0.81 dl./g.

B-7: In the same manner as in B-1 except that the A-7 rubber was substituted for the A-1 rubber, to obtain a graft polymer. The [$\eta$] value of the extracted polymer was 0.77 dl./g.

C. Preparation of resin latex for blending

In a reactor, 0.15 part of KPS was dissolved in 200 parts of deionized water and the air was replaced by nitrogen. Separately, 1 part of Pelex OTP and 0.3 part of laurylmercaptan were dissolved in 100 parts of a mixture of St/AN/MMA=50/20/30 (weight ratio), and flushed with nitrogen. Into the reactor was charged 30 parts of the resulting mixture and heated at 60° C. After polymerization had been initiated, the remaining monomer mixture was added into the reactor continuously over a period of 60 minutes. After completion of the addition, the contents of the reactor were heated to 75° C. and polymerization was continued for 30 minutes to complete the reaction. The conversion was 99% and the [$\eta$] value of the polymer was 0.84 dl./g.

D. Resin composition

The latex obtained in B, in which the content of rubber in the graft polymer was 25%, was coagulated without any further treatment. When the content of rubber in the graft polymer was more than 25%, the latex was blended with a resin latex obtained in C so that the rubber content might become 25%, and the blended latex was then coagulated. The coagulation was effected by pouring the latex into an amount three times the weight thereof of an aqueous solution containing 0.15% of aluminum chloride ($AlCl_3 \cdot 6H_2O$) (90° C.). The coagulated polymer was dehydrated, washed, and then dried. The dry powder thus obtained was pelletized at about 200° C. by means of a 40 mm. extruder. The pellets obtained were designated as D-1 to D-7, corresponding to B-1 to B-7, respectively. The rubber content of D-6 was 33%, which was an exception.

The powder of D-6 was blended with a powder of polycarbonate (Yubilon S-2000, produced by Mitsubishi-Edogawa Chemical Co.) in 50:50 ratio (by weight) and extruded in a similar manner to that mentioned above, to obtain a pellet, which is designated as D-8.

Comparative Example 1

The rubber obtained in A-1 by polymerizing the first stage monomer mixture alone was subjected to graft-polymerization in the same manner as in B-1 to obtain a composition, which is referred to as D-9.

Comparative Example 2

The rubber obtained in A-1 by polymerizing the second stage monomer mixture alone was subjected to graft-polymerization in the same manner as in B-1, to obtain a composition, which is referred to as D-10.

Comparative Example 3

The rubbers obtained in Comparative Examples 1 and 2 were blended in a ratio of 70:30 and the blend was subjected to graft-polymerization in a manner similar to that in B-1, to obtain a composition, which is referred to as D-11.

Each of the pellets of D-1 to D-11 was molded into a plate of 110 x 110 x 3 mm., by means of an injection molding machine (V-14-65, screw type, of Nippon Seiko Kabushiki Kaisha) (1.2 $\phi$ pin-point gate) at a cylinder temperature of 240° C. The impact strength and weather resistance of these plates were evaluated to obtain the results shown in Table 2. The effectiveness of the present invention is apparent from comparison of the test results of D-1 with those of D-9, D-10 and D-11.

In the "Dynstat impact strength" column in Table 2, "longitudinal" means the impact strength when impact was applied to the test specimen at a right angle to the flow direction of molten resin, and "transversal" means the impact strength when impact was applied in parallel to the flow direction. The notched Izod impact strength was measured on an injection-molded test specimen. Weather resistance was shown in terms of the period of time (hours), at which the retention of the Dynstat impact strength became 50% in the accelerated exposure test using a Weather-O-Meter (Type WE-II, manufactured by Toyo Rika).

TABLE 2

| | Dynstat impact strength (kg.-cm./cm.²) | | Notched Izod impact strength (kg.-cm./cm.²) | Weather-resistance (hour) | Color change on weather-resistance | Irregular reflexion and weld line |
|---|---|---|---|---|---|---|
| | Longitudinal | Transversal | | | | |
| D-1 | 85 | 83 | 15.3 | 800 | None | ○ |
| D-2 | 86 | 83 | 17.5 | 850 | ___do___ | ○ |
| D-3 | 75 | 67 | 13.0 | 750 | ___do___ | ○ |
| D-4 | 83 | 80 | 14.0 | 800 | ___do___ | ○ |
| D-5 | 84 | 82 | 12.5 | 750 | ___do___ | ○ |
| D-6 | 77 | 77 | 35.0 | >3,000 | ___do___ | ○ |
| D-7 | 87 | 84 | 18.0 | 800 | ___do___ | ○ |
| D-8 | (¹) | (¹) | 60-70 | >3,000 | ___do___ | ○ |
| Comparative: | | | | | | |
| D-9 | 74 | 61 | 9.4 | 600 | ___do___ | x |
| D-10 | 83 | 51 | 4.3 | 500 | ___do___ | ○ |
| D-11 | 80 | 81 | 5.1 | 600 | ___do___ | △ |
| Commercial ABS resin | 68 | 65 | 27.0 | 50 | Changed from yellowish white to yellowish brown. | ○ |

¹ No break.

NOTE.—○=No irregular reflexion.   △=Some irregular reflexion.   x=Marked irregular reflexion.

What is claimed is:

1. In a weather- and impact-resistant resin composition obtained by polymerizing (b) 5 to 1900 parts by weight of a monomer mixture of (1') 90 to 10 parts by weight of an aromatic vinyl compound and (2') 10 to 90 parts by weight of at least one compound selected from acrylonitrile, methyl methacrylate, methyl acrylate, ethyl acrylate and n-butyl acrylate (the total of (1') and (2') being 100 parts by weight) in the presence of (a) 100 parts by weight (solids) of a latex of a crosslinked elastomer consisting of (1) 60 to 99.9 parts by weight of at least one acrylic ester, (2) 39.9 to 0 part by weight of at least one monomer copolymerizable with said acrylic ester, and (3) 0.1 to 10 parts by weight of a crosslinking monomer having 2 or more functional groups and copolymerizable with said (1) and (2) monomers, or an organic peroxide, or a mixture of both compounds (the total of (1), (2) and (3) being 100 parts by weight); and mixing the resultant polymer (c) with a rigid resin (d), said rigid resin being a styrene-acrylonitrile copolymer, a styrene-acrylonitrile-methyl methacrylate terpolymer or a styrene-acrylonitrile-acrylic ester terpolymer, whereby upon the addition of said rigid resin (d) the resin composition contains 5 to 40% by weight of (a), an improvement in which the particles of said crosslinked elastomer latex have at least two layers different in degree of swelling, the outer layers thereof having higher elasticity than the inner layer, the central layer containing 90 to 40 parts by weight of the 100 parts by weight of (a) and having a degree of swelling of 7 to 30 and the outer layers containing 10 to 60 parts by weight of the 100 parts by weight of (a) and having a degree of swelling of 7 to 3, and differing from the degree of swelling of said central layer.

2. A resin composition according to claim 1, wherein at least one of the acrylic esters in (a) is an alkyl acrylate in which the alkyl group has 1 to 8 carbon atoms.

3. A resin composition according to claim 2, wherein the alkyl acrylate is methyl, ethyl, n-butyl, or 2-ethylhexyl acrylate.

4. A resin composition according to claim 1, wherein the monomer (2) copolymerizable with the acrylic ester (1) in (a) is selected from the group consisting of methyl methacrylate, acrylonitrile, methacrylonitrile, styrene, α-methylstyrene, and acrylamide.

5. A resin composition according to claim 1, wherein the crosslinking monomer in (a) is ethylene glycol dimethacrylate, triallyl cyanurate, triallyl isocyanurate, triallyl phosphate, 1,3,5-triacryloylhexahydro-s-triazine, or allyl methacrylate.

6. A resin composition according to claim 1, wherein the central layer and the outer layers of the particle in the crosslinked elastomer latex have the same monofunctional monomer composition, and the degree of swelling of the central layer is higher than that of the outer layers owing to the difference in either the kind or the quantity of the crosslinking agent or in both.

7. A resin composition according to claim 1, wherein the kind and the quantity of the crosslinking agent are the same between the central layer and the outer layers of the particle in the crosslinked elastomer latex, and a comonomer capable of giving a more rigid polymer is contained in the copolymerized form in the outer layers.

8. A resin composition according to claim 1, wherein the alkyl acrylate in the outer layers of the particle in the crosslinked elastomer latex is capable of producing a polymer having a higher glass transition temperature than that of a polymer produced from the alkyl acrylate in the central layer.

9. A process for producing a weather- and impact-resistant resin composition, which comprises dividing a monomer mixture (a) consisting of (1) 60 to 99.9 parts by weight of at least one acrylic ester, (2) 39.9 to 0 part by weight of at least one monomer copolymerizable with the monomer (1), and (3) 0.1 to 10 parts by weight of a cross-linking monomer having two or more functional groups and copolymerizable with the monomers (1) and (2), or an organic peroxide, or a mixture of the cross-linking monomer and the organic peroxide (the total of (1), (2) and (3) being 100 parts by weight) into a first portion and a second portion, the proportion of said first portion to the second portion being 90 to 40 parts by weight to 10 to 60 parts by weight; emulsion-polymerizing the first portion in an aqueous medium in a conventional manner to prepare a latex of a polymer having a degree of swelling of 30 to 7; then polymerizing the second portion in the resulting latex under the conditions under which the amount of a dispersion stabilizer is maintained at the level necessary to coat the surface of latex particles so that the second portion of the monomer mixture may be polymerized around the latex particles to prepare a latex of multi-layer polymer particles (a) in which the outer polymer layer formed from the second portion of the monomer mixture has a degree of swelling different from the degree of swelling of said central layer and in the range of 7 to 3; polymerizing the presence of 100 parts by weight (solids) of the resulting latex 10 to 1900 parts by weight of a monomer mixture (b) consisting of (1') 90 to 10 parts by weight of an aromatic vinyl compound and (2') 10 to 90 parts by weight of at least one compound selected from acrylonitrile, methyl acrylate, ethyl acrylate and n-butyl acrylate (the total of (1') and (2') being 100 parts by weight) in the presence of a radical initiator; and admixing the resulting polymer (c) with a rigid resin (d), said rigid resin being a styrene-acrylonitrile copolymer, a styrene-acrylonitrile-methyl methacrylate terpolymer or a styrene-acrylonitrile-acrylic ester terpolymer, whereby upon the addition of said rigid resin (d) the resin composition contains 5 to 40% by weight of (a) based on the resin composition.

References Cited

UNITED STATES PATENTS

| | | | |
|---|---|---|---|
| 3,562,235 | 2/1971 | Ryan | 260—885 |
| 3,502,604 | 3/1970 | Nakatsuka et al. | 260—29.6 |
| 3,041,308 | 6/1962 | Baer | 260—876 X |

MURRAY TILLMAN, Primary Examiner

C. J. SECCURO, Assistant Examiner

U.S. Cl. X.R.

260—873, 881, 885